(12) United States Patent
Diehl et al.

(10) Patent No.: US 12,397,409 B2
(45) Date of Patent: Aug. 26, 2025

(54) HANDHELD WORK APPARATUS

(71) Applicant: Andreas Stihl AG & Co. KG, Waiblingen (DE)

(72) Inventors: Heiko Diehl, Esslingen (DE); Alexander Haertel, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 13 days.

(21) Appl. No.: 18/395,035

(22) Filed: Dec. 22, 2023

(65) Prior Publication Data

US 2024/0208029 A1 Jun. 27, 2024

(30) Foreign Application Priority Data

Dec. 22, 2022 (DE) ...................... 10 2022 134 555.6

(51) Int. Cl.
*B25F 5/02* (2006.01)

(52) U.S. Cl.
CPC ...................... *B25F 5/02* (2013.01)

(58) Field of Classification Search
CPC ........................................................ B25F 5/02
See application file for complete search history.

(56) References Cited

U.S. PATENT DOCUMENTS

| | | | | |
|---|---|---|---|---|
| 4,389,779 A * | 6/1983 | Overbury | ............ | B27B 17/0008 30/295 |
| 4,411,071 A * | 10/1983 | Takahashi | ............... | F16F 15/08 30/381 |
| 4,749,049 A * | 6/1988 | Greppmair | ............... | F16F 15/08 173/162.2 |
| 7,300,243 B2 * | 11/2007 | Saitou | ................... | A47L 9/0081 416/63 |
| 11,472,017 B2 * | 10/2022 | Shangguan | ............... | H02K 7/14 |
| 2006/0179602 A1 * | 8/2006 | Schliemann | ............... | A47L 5/14 15/330 |
| 2007/0044984 A1 * | 3/2007 | Fischer | ................... | B25F 5/006 173/217 |
| 2013/0185899 A1 * | 7/2013 | Zhang | ................... | B25D 17/043 16/431 |
| 2017/0225316 A1 * | 8/2017 | Iwakami | ................... | B25F 5/02 |

(Continued)

FOREIGN PATENT DOCUMENTS

| CN | 103875352 A | * | 6/2014 | ............ A01D 34/90 |
| DE | 38 11 788 A1 | | 10/1989 | |

(Continued)

*Primary Examiner* — Lucas E. A. Palmer
(74) *Attorney, Agent, or Firm* — Walter Ottesen, P.A.

(57) ABSTRACT

A handheld work apparatus includes a housing and a work tool arranged on the front end. The housing has a back end to which an operator region is assigned. The housing has a first and a second shell separable in a separation direction. The operator region, in the region of the back end, is bounded by a tubular section of an outer housing wall. The outer wall of the first shell is reinforced in the region of the tubular section by a rib structure inside the housing. In a view in the separation direction of the inner side of the first shell, in the region of the tubular section, the first shell has an interconnected rigid rib region and an interconnected elastic expansion region. The expansion region is directly adjacent to the rib region and is at a greater distance from the back end than the rib region.

20 Claims, 5 Drawing Sheets

(56) References Cited

U.S. PATENT DOCUMENTS

| | | | | |
|---|---|---|---|---|
| 2017/0239803 A1* | 8/2017 | Aoki | .................... | B25F 5/008 |
| 2017/0326721 A1* | 11/2017 | Shimizu | .................. | B25F 5/026 |
| 2018/0009098 A1* | 1/2018 | Nagasaka | ............... | B25F 5/026 |
| 2019/0240859 A1* | 8/2019 | Huber | ...................... | B25F 5/02 |
| 2020/0215679 A1* | 7/2020 | Tamura | .................... | B25F 5/02 |
| 2021/0379752 A1* | 12/2021 | Seiz | .......................... | B25F 5/02 |
| 2022/0088763 A1* | 3/2022 | Bathke | ................... | B25F 5/026 |
| 2022/0379455 A1* | 12/2022 | Wakita | ................... | H02K 5/22 |
| 2025/0091189 A1* | 3/2025 | Hu | ........................ | B25B 21/02 |

FOREIGN PATENT DOCUMENTS

| | | | | |
|---|---|---|---|---|
| DE | 10 2005 027 497 A1 | 1/2006 | | |
| DE | 11 2018 005 485 T5 | 10/2020 | | |
| EP | 2 181 810 A1 | 5/2010 | | |
| RU | 2228134 C1 * | 5/2004 | ............. | A47L 9/181 |

* cited by examiner

HANDHELD WORK APPARATUS

CROSS-REFERENCE TO RELATED APPLICATIONS

This application claims priority of German patent application no. 10 2022 134 555.6, filed Dec. 22, 2022, the entire content of which is incorporated herein by reference.

BACKGROUND

In the case of work apparatuses, the housing of which is composed of two housing shells, the housing shells usually have an outer wall which is reinforced on the inner side by a rib structure. To protect the housing in the event of an impact or fall of the work apparatus from a certain height, an additional elastic component which can cushion and elastically absorb the energy released during the impact is usually provided. Such an additional component is usually arranged on the outer side of the housing in the region of the tubular section that bounds the handle opening in the operator region. The fastening of such an additional elastic component is structurally complex and costly. In particular for battery-powered work apparatuses, especially high-powered ones, the requirements that the work apparatus must meet in the event of an impact or fall are high because of the increasing weight and the centroid which is changed in comparison to an internal combustion engine.

SUMMARY

It is an object of the disclosure to provide a work apparatus in such a way that it can easily and cost-effectively absorb the energy released in the event of an impact.

This object is, for example, achieved by a handheld work apparatus including: a housing having a front end; a work tool arranged on the front end of the housing; the housing having a back end to which an operator region of the housing is assigned; the housing having a first housing shell and a second housing shell configured to be separable in a separation direction and assembled when assembling the housing; the housing having an outer wall; the first housing shell including a first segment of the outer wall; the operator region defining a handle opening which completely penetrates the housing in the separation direction; the operator region being bounded by a tubular section of the outer wall in a region of the back end of the housing; the first segment of the outer wall being reinforced in a region of the tubular section by a rib structure inside the housing; wherein, in a view in the separation direction of an inner side of the first housing shell, in the region of the tubular section, the first housing shell has: an interconnected rigid rib region in which the rib structure is arranged, and, an interconnected elastic expansion region for an elastic absorption of energy released in an event of an impact of the work apparatus; and, wherein the interconnected elastic expansion region is directly adjacent to the interconnected rigid rib region and is at a greater distance from the back end of the housing than the rib region.

The disclosure makes provision that, in a view in the separation direction of the inner side of the first housing shell, in the region of the tubular section the first housing shell has an interconnected rigid rib region and an interconnected elastic expansion region. The rib structure is arranged in the interconnected rigid rib region. The interconnected elastic expansion region serves for the elastic absorption of energy released in the event of an impact of the work apparatus. In the elastic expansion region, the rigidity of the handheld work apparatus is lower compared to the rigid rib region. The elasticity of the work apparatus is greater in the elastic expansion region than in the rigid rib region. The interconnected elastic expansion region is directly adjacent to the interconnected rigid rib region. The interconnected elastic expansion region is at a greater distance from the back end of the housing than the interconnected rigid rib region. The interconnected elastic expansion region is free from the rib structure. As a result, upon impact of the work apparatus, in particular on a hard object or on the ground, the energy released in each case can first be introduced into the rigid rib region and cushioned in the elastic expansion region.

The housing of the handheld work apparatus can be manufactured from a single material. An additional elastic component for the elastic absorption of energy is not required. This reduces the structural outlay for producing the handheld work apparatus. The work apparatus can be manufactured cost-effectively. The housing can be manufactured from a relatively hard material. The elastic expansion region means that it is nevertheless sufficiently flexible. Owing to the possibility of using a hard material, the housing of the work apparatus, in particular the operator region of the housing, can have sufficient guiding rigidity for guiding the handheld work apparatus. Owing to the possibility of using a relatively hard material, a low wall thickness compared to the prior art can be provided for the housing. As a result, the operator region and in particular the tubular section of the outer wall of the housing can be slender. This makes it comfortable for an operator to grip the tubular section.

The tubular section extends along a longitudinal center axis. In particular, in a view in the separation direction of the inner side of the first housing shell, the longitudinal center axis divides the tubular section into an expansion half associated with the handle opening and a rib half associated with the back end. Preferably, the interconnected expansion region is completely arranged in the expansion half. The interconnected rib region is advantageously arranged both in the rib half and in the expansion half.

In an embodiment, the elastic expansion region extends in the direction of the longitudinal center axis from a start point to an end point in an extension region. In a view in the separation direction of the housing, the handle opening has a centroid. In a view in the separation direction of the inner side of the first housing shell, the extension region of the interconnected expansion region extends in an interconnected angular range of at least 30°, in particular of at least 40°, preferably of at least 50°, with respect to the centroid. As a result, the work apparatus is free in a large region from the rib structure and can therefore elastically absorb the energy released in the event of an impact of the work apparatus.

In particular, the rib structure has a plurality of ribs. Directly adjacent ribs are each at a neighboring angular distance from one another with respect to the centroid of the handle opening. In particular, the interconnected angular range of the extension region of the expansion region is greater than the largest neighboring angular distance of the plurality of ribs. Advantageously, the largest neighboring angular distance of the plurality of ribs is less than 25°. In particular, the largest neighboring angular distance of the plurality of ribs is less than 20°. As a result, the housing in the tubular section is more elastic in the expansion region than in the rib region.

Along the longitudinal center axis, the tubular section has cross-sectional areas running perpendicularly to the longitudinal center axis. In a view of the first housing shell in the separation direction, the cross-sectional areas each have a diameter measured from the outer side of the outer wall to the outer side of the outer wall of the tubular section.

An associated cross-sectional area runs through the back end of the housing. The diameter of the associated cross-sectional area running through the back end of the housing is referred to as the end diameter. The end diameter runs through the back end of the housing. In the event that the back end of the housing, in a view in the separation direction of the first half-shell of the housing, is not a point, but rather an expanded region, the diameter of the associated cross-sectional areas is referred to as the end diameter that is the largest. In the event that there are a plurality of diameters of associated cross-sectional areas that are of the same size, all these diameters are referred to as end diameters.

The portion of the end diameter that is located in the rib region of the tubular section of the housing is referred to as a rib sub-section of the end diameter. In the event that there are end diameters with different proportions in the rib region, the rib sub-section is assigned to the end diameter with the largest proportion in the rib region. Advantageously, the length of the rib sub-section, as measured along the end diameter, is less than 80% of the end diameter. The portion of the end diameter that is located in the expansion region is referred to as the expansion sub-section of the end diameter. Advantageously, the length of the expansion sub-section, as measured along the end diameter, is more than 20% of the end diameter.

In an embodiment, a maximum diameter of all the cross-sectional areas of the tubular section is at least 120%, in particular at least 130%, preferably at least 140%, of the minimum diameter of all the cross-sectional areas of the tubular section. In particular, the maximum diameter of all the cross-sectional areas in a view in the separation direction intersects the expansion region. As a result, the tubular section is thickened in the region of the expansion region. This allows the housing to efficiently absorb the energy released during the impact of the work apparatus at the tubular section. The energy can be distributed over a large area.

The work apparatus can advantageously be configured such that it can be set down in a set-down position provided for it on a horizontal plane. The expansion region has a maximum expansion height, as measured perpendicularly to the horizontal plane in the set-down position. The handle opening has a maximum opening height, as measured perpendicularly to the horizontal plane in the set-down position. Advantageously, the maximum expansion height is at least 50%, in particular at least 60%, preferably at least 70%, of the maximum opening height. As a result, the expansion region is of a sufficient size to be able to elastically absorb energy in the event of an impact of the work apparatus.

In an embodiment, in a view in the separation direction of the inner side of the first housing shell, the rib region is arranged directly adjacent to the outer wall forming the back end of the housing. This enables the rib structure of the rib region to reinforce the outer wall in the region of the back end, which forms a particularly exposed impact region. The rib region can thus ensure the integrity of the outer wall of the housing in the region of the back end in the event of an impact. The energy can be distributed across the ribs of the rib region.

Advantageously, in a view in the separation direction of the inner side of the first housing shell, the expansion region is arranged directly adjacent to the outer wall bounding the handle opening. Owing to the fact that the expansion region is arranged adjacent to an outer wall, the housing can be particularly flexible.

Expediently, the first housing shell has a connecting element. The connecting element is also referred to as a connecting structure. The connecting element is used for connecting the first housing shell to the second housing shell. In particular, the connecting element is a screw dome. Advantageously, a plurality of ribs of the rib structure are connected to the connecting element in such a way, and are arranged in the first housing shell in such a way, that they can introduce force into the connecting element. This enables the energy to be directed into a central, stable location in the housing. In particular, the first housing shell is connected via the connecting element to the second housing shell in such a way that, via the connecting element, at least some of the energy released in an impact of the work apparatus can be transmitted from the first housing shell via the connecting element to the second housing shell. This enables the energy generated in an impact of the work apparatus to be distributed uniformly across the entire housing. This serves for the integrity of the housing. In particular, in a view in the separation direction of the inner side of the first housing shell, the connecting element is arranged in the rib region.

In an embodiment, the first housing shell and the second housing shell are completely made of glass-fiber-reinforced plastic. In particular, the glass-fiber-reinforced plastic is polyamide 6 (PA6). Advantageously, the PA6 has a glass fiber content of 15%. PA6 with a glass fiber content of 15% is referred to as PA6GF15. Preferably, the PA6 has a glass fiber content of 30% and is referred to as PA6GF30. In particular, the PA6 is impact-modified.

In particular, the second housing shell is formed analogously to the first housing shell with respect to the rib structure and the expansion region. The second housing shell exhibits all of the above-mentioned features of the first housing shell.

The object is, for example, also achieved by a handheld work apparatus including: a housing having a front end; a work tool arranged on the front end of the housing; the housing having a back end to which an operator region of the housing is assigned; the housing extending along a longitudinal axis from the back end to the front end; the housing having a first housing shell and a second housing shell configured to be separable in a separation direction and assembled when assembling the housing; the housing having an outer wall; the first housing shell including a first segment of the outer wall; the operator region defining a handle opening which completely penetrates the housing in the separation direction; the handle opening having a start point, wherein, in a view in the separation direction of an inner side of the first housing shell, the start point is at the smallest distance, as measured in a direction of the longitudinal axis, from the back end of the housing; the housing having a curving section extending in the direction of the longitudinal axis from the back end to the start point; the first segment of the outer wall being reinforced in the region of the curving section by a rib structure inside the housing; wherein, in the view in the separation direction of the inner side of the first housing shell, the first housing shell, in the curving section, has: an interconnected rigid rib section in which a plurality of ribs of the rib structure are arranged, and an interconnected elastic expansion section for an elastic absorption of energy released in an event of an impact of the work apparatus; the interconnected elastic expansion section being directly adjacent to the rib section and being at a greater distance from the back end of the housing than the rib section, wherein, in the view in the separation direction of the inner side of the first housing shell: the rib section has a rib outer contour with a rib surface, the interconnected elastic expansion section has an expansion outer contour with an expansion section surface, an area covered by the plurality of ribs within the rib outer contour is at least 30%, and an area covered by ribs within the expansion outer contour is less than 10% of the expansion section surface.

According to the disclosure, in a view in the separation direction of the inner side of the first housing shell, in the curving section the first housing shell has: an interconnected rigid rib section in which ribs of the rib structure are arranged, and an interconnected elastic expansion section for the elastic absorption of energy released in the event of an impact of the work apparatus. The expansion section is directly adjacent to the rib section and is at a greater distance from the back end of the housing than the rib section. In a view in the separation direction of the inner side of the first housing shell:

the rib section has a rib outer contour with a rib surface,
the expansion section has an expansion outer contour with an expansion section surface,
the area covered by ribs within the rib outer contour is at least 30%, in particular at least 35% of the rib surface, and
the area covered by ribs within the expansion outer contour is less than 10%, in particular less than 5%, preferably 0% of the expansion section surface.

Preferably, in a view in the separation direction of the inner side of the first housing shell, the curving section can have a total outer contour with a curving surface, and the expansion section surface is at least 20%, in particular at least 30%, of the curving surface. As a result, the expansion section surface is of sufficient size to be able to elastically absorb the released energy.

Advantageously, in a view in the separation direction of the inner side of the first housing shell, the rib section can be arranged directly adjacent to the outer wall forming the back end of the housing. In particular, in a view in the separation direction of the inner side of the first housing shell, the expansion section is arranged directly adjacent to the outer wall bounding the handle opening. Owing to the fact that the expansion section is arranged adjacent to an outer wall, the housing can be particularly flexible.

In particular, the second housing shell is formed analogously to the first housing shell with respect to the rib structure and the expansion section. The second housing shell exhibits all of the above-mentioned features of the first housing shell.

In particular, the second housing shell also has a rib region and/or a rib section and an expansion region and/or an expansion section.

In particular, the second housing shell also has a connecting element. The connecting element of the second housing shell may also be referred to as a connecting structure. Expediently, the connecting element of the second housing shell is arranged in the rib region of the second housing shell.

BRIEF DESCRIPTION OF DRAWINGS

The invention will now be described with reference to the drawings wherein.

DETAILED DESCRIPTION

FIGS. 1 to 9 show handheld work apparatuses 1. In the embodiment according to FIGS. 1 and 4 to 9, the handheld work apparatus 1 is a chain saw. In the embodiment according to FIG. 2, the handheld work apparatus 1 is a hedge trimmer. In the embodiment according to FIG. 3, the handheld work apparatus 1 is a cut-off machine. The following description applies in principle to all the embodiments. Should a detail refer only to one of the three embodiments, this is explicitly stated.

The work apparatus is hand-guided during operation as intended. The work apparatus 1 is a portable work apparatus. In this context, the term "portable" should be understood as meaning that the work apparatus can be carried during operation as intended. During the operation of the work apparatus, the work apparatus 1 does not need to be supported by a device or a workpiece. The work apparatus can be carried by the operator alone during operation as intended.

Figure 1:
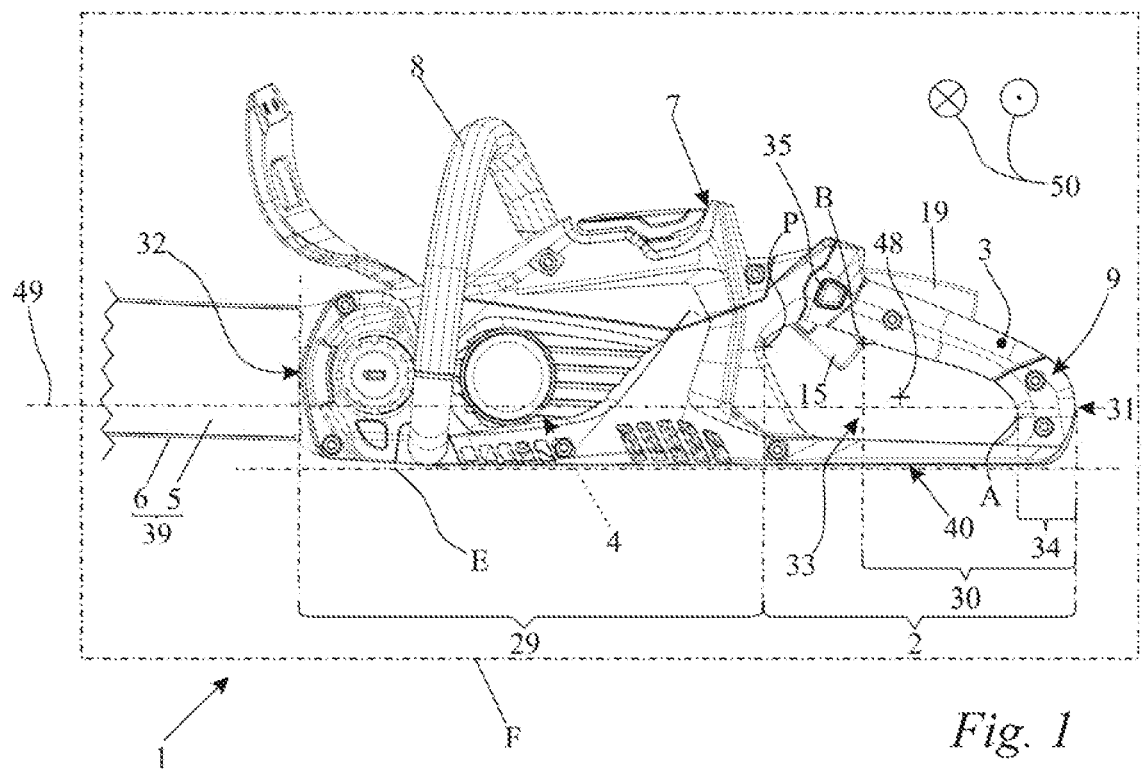
FIG. 1 shows a schematic side view of a work apparatus in the form of a chain saw.
Figure 2:
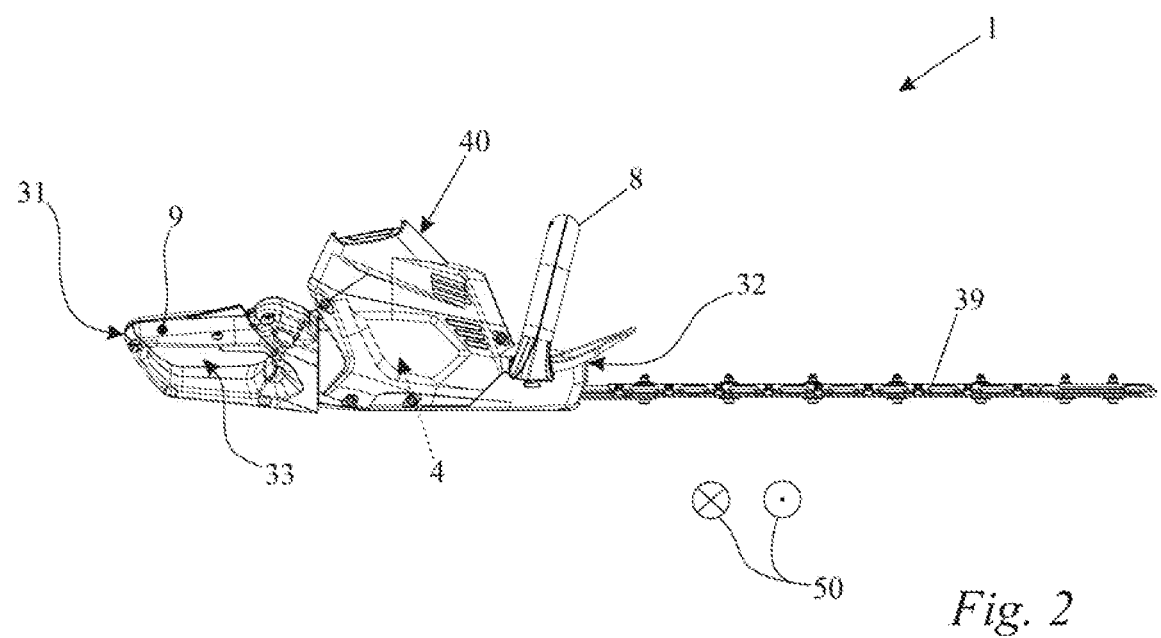
FIG. 2 shows a schematic side view of a work apparatus in the form of a hedge trimmer.
Figure 3:
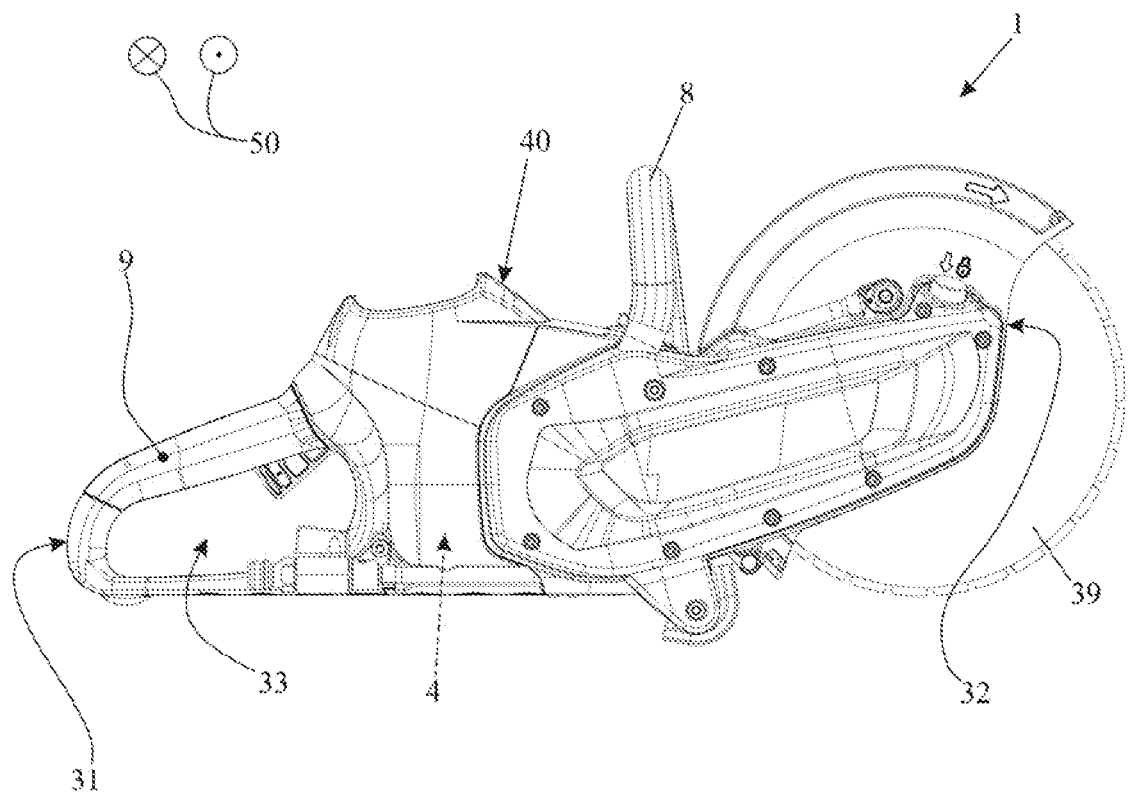
FIG. 3 shows a schematic side view of a work apparatus in the form of a cut-off machine.

As shown in FIGS. 1 to 3, the work apparatus 1 includes a housing 40. The work apparatus 1 includes a work tool 39. The work tool 39 is arranged on the housing 40. In the embodiments, the work tool 39 is fastened to the housing 40. In the embodiment according to FIGS. 1 and 4 to 9, the work tool 39 is formed by a guide bar 5 and a saw chain 6. In the embodiment according to FIG. 2, the work tool 39 is formed by a blade bar. In the embodiment according to FIG. 3, the work tool 39 is formed by a saw blade.

The work apparatus 1 includes an electric motor 4 in the embodiments. Alternatively, however, a different type of motor, for example an internal combustion engine, may also be provided. The electric motor 4 is used to drive the work tool 39. In the embodiment according to FIGS. 1 and 4 to 9, the saw chain 6 is driven in a circulating manner around the guide bar 5 via the electric motor 4. In all the embodiments, the electric motor 4 is arranged in the housing 40.

The work apparatus 1 includes a tubular handle 8. The tubular handle 8 partially embraces the housing 40. It may also be provided that the tubular handle completely embraces the housing. The tubular handle 8 engages over the handle housing 40. During operation of the work apparatus 1 as intended, the operator can grip the tubular handle 8 from above. The tubular handle 8 is a bale handle.

The housing 40 has a back end 31. The back end 31 faces the user during operation of the work apparatus 1. The housing 40 has a front end 32. The front end 32 of the housing 40 faces away from the operator during operation of the work apparatus as intended. The work tool 39 is arranged at the front end 32. In the embodiments, the housing 40 encloses an interconnected interior space.

Figure 4:
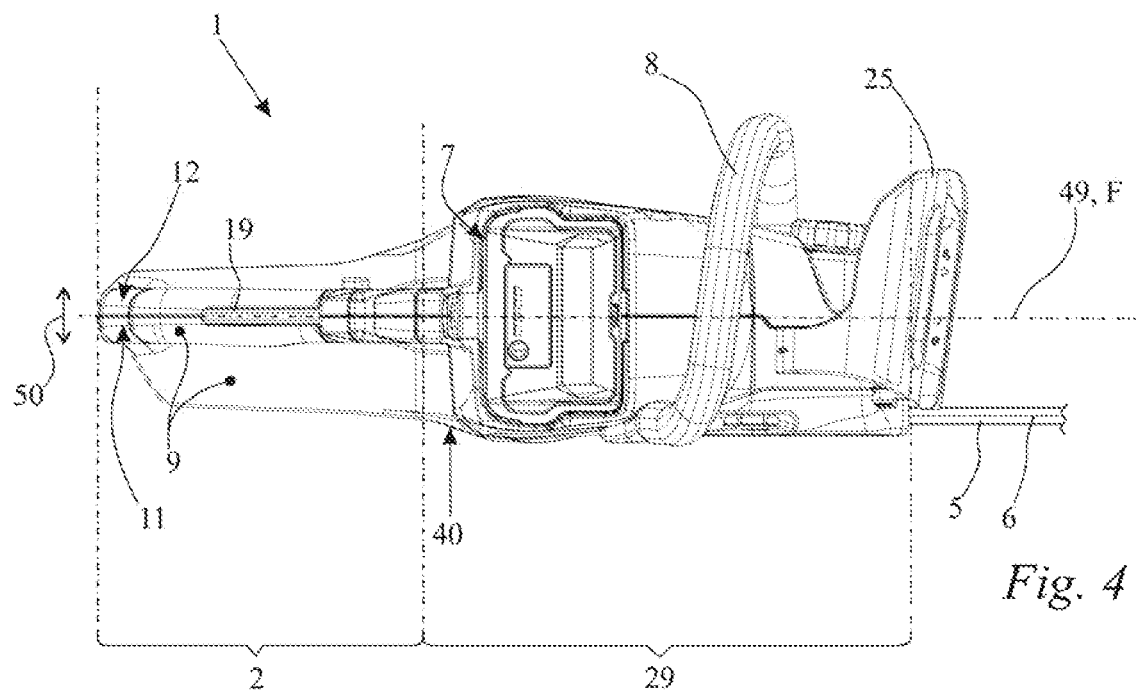
FIG. 4 shows a schematic plan view from above of the work apparatus from FIG. 1.

As illustrated in FIG. 4 by way of example for all the embodiments, the housing 40 is formed by a first housing shell 11 and a second housing shell 12. The first housing shell 11 and the second housing shell 12 are also referred to as half shells. The first housing shell 11 and the second housing shell 12 lie adjacent to each other along a separation surface. When assembling the housing 40, the first housing shell 11 and the second housing shell 12 can be assembled in a separation direction 50. The separation direction 50 is also referred to as the joining direction. The separation direction 50 corresponds to the demolding direction of the first housing shell 11. The separation direction 50 corresponds to the demolding direction of the first housing shell 11, as seen with respect to the first housing shell 11. The separation direction 50 corresponds to the demolding direction of the second housing shell 12, as seen with respect to the second housing shell 12. The separation direction 50 is a double direction. The separation direction 50 points in two opposite directions. The fully assembled housing 40 can be separated in the separation direction 50. In this case, the first housing shell 11 can be removed from the second housing shell 12 in the separation direction 50. Only a single movement of the second housing shell 12 in the direction of the separation direction 50 relative to the first housing shell 11 is required here.

The first housing shell 11 and the second housing shell 12 are injection molded parts. The first housing shell 11 and the second housing shell 12 are composed exclusively of glass-fiber-reinforced plastic. In particular, the first housing shell 11 and the second housing shell 12 are composed of polyamide 6 (PA6). The polyamide 6 (PA6) is preferably reinforced with a glass fiber content. Preferably, the glass fiber content of the polyamide 6 is 15% (PA6GF15), in the embodiments 30% (PA6GF30). In particular, the polyamide 6 (PA6), preferably PA6GF15, in the embodiments PA6GF30, is impact-modified.

In the embodiments, the first housing shell 11 is formed in one piece. The first housing shell 11 is in particular cast in a single injection molding process step. In the embodiments, the second housing shell 12 is formed in one piece. The second housing shell 12 is produced in particular in a single injection molding process step.

When assembled, the housing shells 11 and 12 form the housing 40. It may be provided that the housing encloses two interior spaces formed separately from each other. In particular, the housing may include a motor housing and a handle housing which are formed separately from each other. The motor, in particular an electric motor, and in particular a battery shaft, are then arranged in the motor housing. The motor housing and the handle housing can be connected to each other via an oscillating gap and antivibration elements bridging the oscillating gap. In this case, the housing includes four housing shells. In the embodiments, however, only two housing shells are provided in total for forming the housing. The housing 40 formed exclusively by the first housing shell 11 and the second housing shell 12 fulfills both the function of housing the electric motor 4 and the function of forming a handle region. Between these two functional regions of the housing 40, no separate antivibration elements, such as springs or buffer elements, are provided in the embodiments.

The housing 40 has a handle opening 33, as shown for example in FIG. 1. The handle opening 33 completely penetrates the housing 40 of the work apparatus 1. The handle opening 33 completely penetrates the housing 40 in the separation direction 50. The housing 40 has an operator region 2. The handle opening 33 is arranged in the operator region 2.

The work apparatus 1 is configured such that it can be set down in a set-down position provided for it on a horizontal plane E. It may be provided that the work apparatus 1 has a set-down surface for setting the work apparatus 1 down in the set-down position. In the embodiments, the work apparatus 1 has set-down protrusions on which it can be set down on the horizontal plane E. In the set-down position, the work apparatus 1 can be set down on the horizontal plane E in such a way that the tubular handle 8 can be gripped from above by the operator. In this way, the work apparatus 1 can be raised and picked up quickly and easily. The horizontal plane E runs horizontally. In the set-down position, the separation direction 50 runs parallel to the horizontal plane E. The housing 40 is divided vertically into the first housing shell 11 and the second housing shell 12.

As illustrated in particular in FIG. 1, the housing 40 extends along a longitudinal axis 49. The longitudinal axis 49 extends from the back end 31 of the housing 40 to the front end 32 of the housing 40. In all the embodiments, the longitudinal axis 49 runs parallel to a work tool plane. As in the embodiments according to FIGS. 1 and 4 to 9, the longitudinal axis 49 runs parallel to the plane of the guide bar 5. In the embodiment according to FIG. 2, the longitudinal axis 49 runs parallel to the plane in which the blade bars move back and forth. In the embodiment according to FIG. 3, the longitudinal axis 49 runs parallel to the plane of the saw blade.

The work apparatus 1 has a longitudinal plane F, shown in FIG. 1. In the set-down position, the longitudinal plane F runs perpendicularly to the horizontal plane E. The longitudinal plane F contains the longitudinal axis 49. In the embodiments, the separation direction 50 runs perpendicularly to the longitudinal plane F. In the embodiments, the first housing shell 11 and the second housing shell 12 are adjacent to each other in the longitudinal plane F. The longitudinal plane F may also be referred to as a separation plane of the housing 40 or as a division plane of the housing 40. However, it may also be provided that the two housing halves lie adjacent to each other along a separation surface that extends in a plurality of planes. In the embodiments, the separation surface between the first housing shell 11 and the second housing shell 12 extends in a single plane. In the embodiments according to FIGS. 1 and 4 to 9, the longitudinal plane F runs parallel to the plane of the guide bar 5. In the embodiment according to FIG. 2, the longitudinal plane F runs perpendicularly to the plane in which the blade bars move against each other. In the embodiment according to FIG. 3, the longitudinal plane F runs parallel to the plane of the saw blade.

The operator region 2 of the housing 40 extends in the direction of the longitudinal axis 49 from the back end 31 of the housing 40 to one end of the handle opening 33. The handle opening 33 has an end point P. The end point P is arranged at the edge of the handle opening 33. The end point P is the point of the handle opening 33 that is at the greatest distance, as measured in the direction of the longitudinal axis 49, from the back end 31 of the housing 40.

The operator region 2 of the housing 40 extends in the direction of the longitudinal axis 49 from the back end 31 of the housing 40 to the end point P. In the operator region 2, an operator-controlled element 15 is arranged for operating an electric motor 4 of the work apparatus 1. The operator-controlled element 15 is also referred to colloquially as a throttle lever. The handle opening 33 is completely arranged in the operator region 2 of the housing 40. The housing 40 has an outer wall 3. The outer wall 3 has a tubular section 9. In this context, 'tubular' includes all shapes that run in a closed manner about a central axis. The tubular section 9 of the outer wall 3 of the housing 40 at least partially bounds the handle opening 33. The tubular section 9 bounds the handle opening 33 in the region of the back end 31 of the housing 40. The tubular section 9 is completely arranged in the operator region 2 of the housing 40. The operator-controlled element 15 is arranged in the tubular section 9 of the outer wall 3. The tubular section 9 is bent over in the region of the back end 31. The tubular section 9 has a curvature in the region of the back end 31 of the housing 40. The tubular section 9 is bent over by at least 145° in the region of the back end 31 of the housing 40.

It can be seen in FIG. 4 that, in a view from above of the work apparatus 1, in the region which lies closer to the horizontal plane E (FIG. 1), the tubular section 9 is wider than in the region which is further away from the horizontal plane E on the other side of the handle opening 33. Such a configuration of the section 9 is also referred to as tubular. However, the tubular section 9 has a section that can be gripped by the user.

In a view in the separation direction 50 of the housing 40, the handle opening 33 has a centroid 48, shown in FIG. 1. The centroid 48 is the surface bounded by the outer contour of the handle opening 33, in a view in the separation direction 50 of the housing 40. In a view in the separation direction 50 of the housing 40, the tubular section 9 runs by at least 270° around the centroid 48. The tubular section 9 is closed toward the back end 31 of the housing 41, in a view in the separation direction 50 of the housing 40. To operate the work apparatus 1, the operator can grip the tubular section 9 in such a way that the operator can operate the operator-controlled element 15. The tubular section 9 is opened toward the front end 32 of the housing 40, in a view in the separation direction 50 of the housing 40.

The operator-controlled element 15 has an operating point B. The operating point B is the point of the operator-controlled element 15 of the operator-controlled element that is visible in the unactuated state of the operator-controlled element 15, in a view in the separation direction 50 of the housing 40, and that is at the smallest distance, as measured in the direction of the longitudinal axis 49, from the back end 31 of the housing 40. Starting from the operating point B, a tube region 30 extends in the direction of the longitudinal axis 49 as far as the back end 31 of the housing 40. The tube region 30 is shown in FIG. 1. The tubular section 9 of the outer wall 3 of the housing 40 extends exclusively in the tube region 30. The tubular section 9 extends over the entire tube region 30 with respect to the direction of the longitudinal axis 49. Owing to the fact that the tubular section 9 is bent over, the tubular section 9 extends twice over the entire tube region 30. An end point of the tubular section 9 and a start point of the tubular section 9 are each arranged at the same end of the tube region 30, namely at the end of the tube region 30 facing away from the back end 31.

The housing 40 has a frontal region 29. The frontal region 29 extends in the direction of the longitudinal axis 49 from the end point P of the handle opening 33 as far as to the front end 32 of the housing 40.

The housing 40 has a curving region 34. The curving region 34 is arranged at the back end 31 of the housing 40. In the curving region 34, the tubular section 9 of the housing 40 curves. The curving region 34 is arranged in the operator region 2 of the housing 40. The curving region is arranged in the tubular section 9.

The handle opening 33 has a start point A. The start point A is arranged at the edge of the handle opening 33. The start point A is the point of the handle opening 33 that is at the smallest distance, as measured in the direction of the longitudinal axis 49, from the back end 31 of the housing 40. The curving region 34 extends from the back end 31 to the start point A of the handle opening 33 in the longitudinal direction 49 of the housing 40, in a view in the separation direction 50 of the inner side of the first housing shell 11.

The work apparatus 1 includes a battery shaft 7. The battery shaft 7 is formed by the housing 40 in the embodiments. The battery shaft 7 is arranged in the frontal region 29 of the housing 40. The battery shaft 7 is bounded by an outer side of the housing 40. The work apparatus is preferably configured such that the battery shaft 7 encloses a battery pack, not shown, which is inserted into the battery shaft 7 with respect to a circumferential direction around the insertion direction such that only one end side of the battery pack is visible from outside the battery shaft 7. The direction of insertion of the battery into the battery shaft 7 runs parallel to the longitudinal plane F. It may also be provided that the battery shaft is formed separately from the housing.

Figure 5:
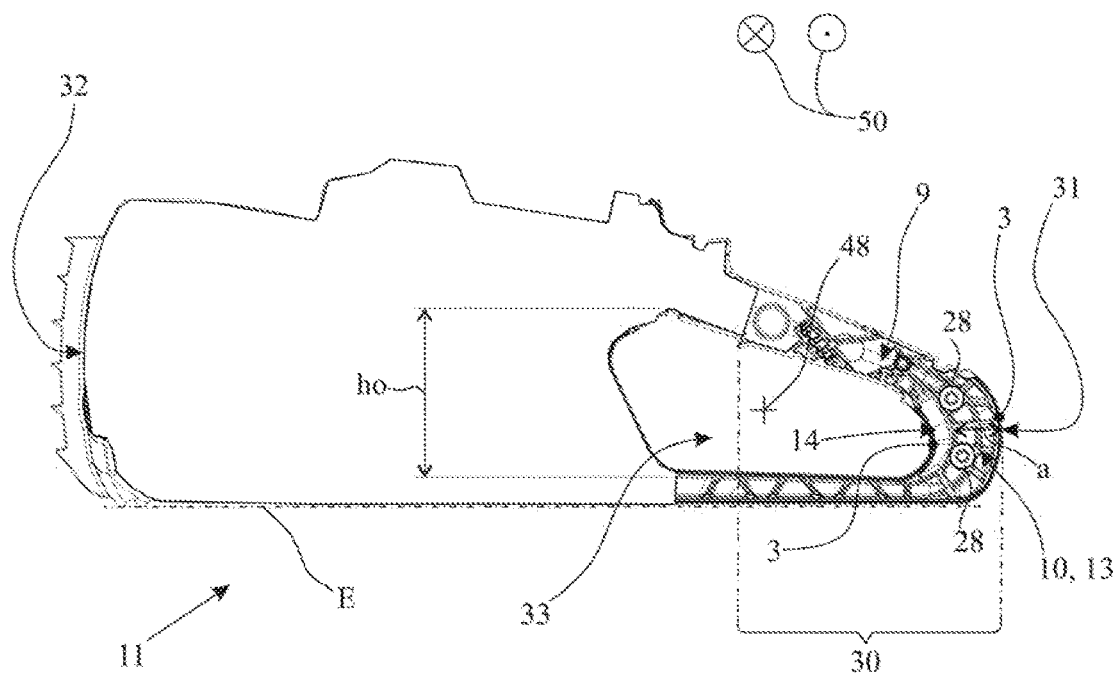
FIG. 5 shows a schematic view in the separation direction of the two housing shells shown in FIG. 4 on the inner side of the first housing shell.

FIG. 5 shows the first housing shell 11 in a view in the separation direction 50 of the inner side of the first housing shell 11. The outer wall 3 of the first housing shell 11 is reinforced in the region of the tubular section 9 by a rib structure 10 inside the housing 40. In a view in the separation direction 50 of the inner side of the first housing shell 11, in the region of the tubular section 9, the first housing shell 11 has an interconnected rigid rib region 13. The rib structure 10 is arranged in the interconnected rigid rib region 13 of the first housing shell 11. The rib structure 10 is completely arranged in the interconnected rigid rib region 13. The rib region 13 is arranged in the operator region 2 shown in FIG. 1.

In a view in the separation direction 50 of the inner side of the first housing shell 11, in the region of the tubular section 9, the first housing shell 11 has an interconnected elastic expansion region 14. The interconnected elastic expansion region 14 is used for the elastic absorption of energy released in the event of an impact of the work apparatus 1. The expansion region 14 has a lower rib density than the rib region 13. In a view in the separation direction 50 of the inner side of the first housing shell 11, the expansion region 14 has a smaller area of ribs per unit area than the rib region 13. In particular, the area of ribs per unit area in the rib region 13 is at least 130%, advantageously at least 200%, preferably at least 250%, of the area of ribs in the expansion region 14. In particular, the area of ribs in the expansion region 14 is at most 70%, in particular at most 50%, preferably at most 30% of the area of ribs in the rib region 13. The expansion region 14 is free from the rib structure 10 in the embodiments. The expansion region of the first housing shell 11 has a lower rigidity than the interconnected rigid rib region 13 of the first housing shell 11. The work apparatus 1 is configured such that, in the event of an impact of the work apparatus 1 with the region around the back end 31 of the housing 40 against a hard object, the interconnected elastic expansion region 14 of the first housing shell 11 means that elastic deformation of the housing 40 is possible. In this way, the energy released during the impact can be elastically absorbed by the housing 40. Owing to the reinforcement of the outer wall 3 of the housing 40 in the rib region 13, the rigidity of the housing 40 in the rib region 13 is greater than in the expansion region 14.

The interconnected elastic expansion region 14 is adjacent directly to the interconnected rigid rib region 13. The expansion region 14 is at a distance a from the back end 31 of the housing 40. The distance a of the expansion region 14 from the back end 31 of the housing 40 is greater than the distance of the rib region 13 from the back end 31 of the housing 40. In the embodiments, the rib region 13 directly adjoins the back end 31 of the housing 40.

Figure 7:
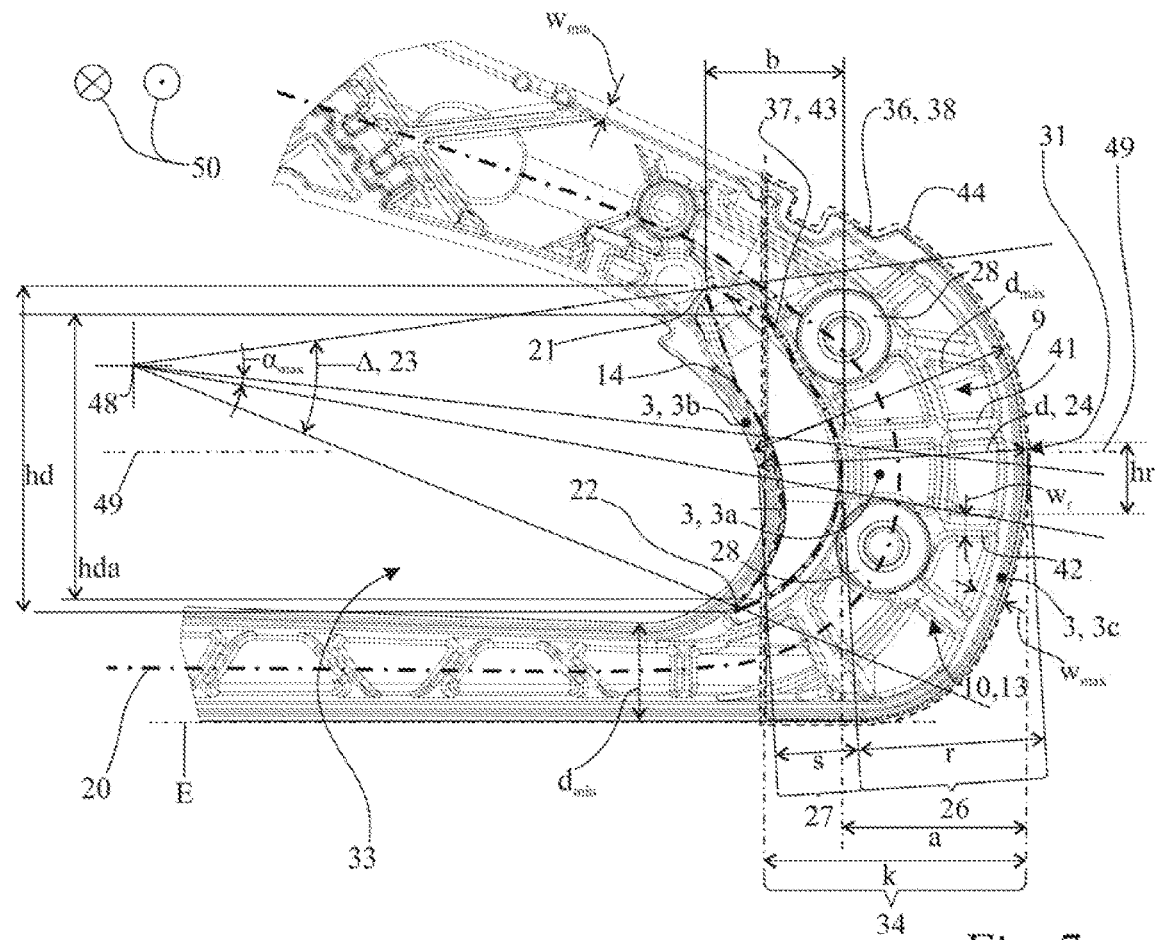
FIG. 7 shows an enlarged detailed illustration of the tubular section of the first housing shell shown in FIG. 5.

As shown in FIG. 7, for example, the rib structure 10 includes a rib 41 and a rib 42. In a view in the separation direction 50, the housing wall 3 has a part 3a running transversely with respect to the separation direction 50. The rib 40, 41 protrudes over the outer wall 3 in the separation direction 50 toward the inner side of the housing 40. Starting from the part 3a of the housing wall 3 running transversely with respect to the separation direction 50, the rib 41, 42 extends in the separation direction 50 toward the inner side of the first housing shell 11. The first housing shell 11 has a shell height, not shown, as measured in the separation direction 50. The rib 41, 42 extends over 60% to 90% of the shell height. The outer wall 3 has a smallest wall thickness $w_{min}$. The rib 41, 42 has a wall thickness wr. The wall thickness wr of the rib 41, 42 is at least 120%, in particular at least 130%, in the embodiments at least 150% of the smallest wall thickness $w_{min}$, of the outer wall 3 of the housing 40.

As shown in FIG. 7, the tubular section 9 extends along a longitudinal center axis 20. The longitudinal center axis 20 runs within the housing closed by the two housing shells 11 and 12 through the points at the greatest distance from the outer wall 3 of the housing 40 in the tubular section 9.

In a view in the separation direction 50 of the inner side of the first housing shell 11, the tubular section arranged in the tube region 30 (FIG. 5) has an outer contour, which bounds a total area. The outer contour of the expansion region 14 shown in FIG. 7 bounds an expansion surface, in a view in the separation direction 50 of the inner side of the first housing shell 11. The expansion surface is at least 10%, in the embodiments at least 15% of the total area.

In a view in the separation direction 50 of the inner side of the first housing shell 11, the longitudinal center axis 20 divides the tubular section 9 into an expansion half 17 associated with the handle opening 33 and a rib half 18 associated with the back end 31 of the housing 40. The expansion half 17 faces the handle opening 33. The rib half faces away from the handle opening 33. The interconnected expansion region 14 is completely arranged in the expansion half 17. The interconnected rib region 13 is arranged both in the rib half 18 and in the expansion half 14.

The elastic expansion region 14 extends in the direction of the longitudinal center axis 20 from a start point 21 to an end point 22 in an extension region 23. The direction of the longitudinal center axis 20 is curved. The extension region 23 lies adjacent to the longitudinal center axis 20. To a certain extent, the extension region 23 extends along the longitudinal center axis 20 next to the longitudinal center axis 20. In colloquial terms, the extension region 23 runs substantially parallel to the longitudinal center axis 20.

In a view in the separation direction 50 of the inner side of the first housing shell 11, the extension region 23 of the interconnected expansion region 14 extends in an interconnected angular range Δ of at least 30°, in particular of at least 40°, of at least 50° in the embodiment, with respect to the centroid 48 of the handle opening 33. The interconnected angular range Δ is measured around the centroid 48, in a view in the separation direction 50. The interconnected angular range Δ is measured in a circumferential direction around the centroid 48, in a view in the separation direction 50. In the interconnected angular range Δ, the expansion region 14 of the first housing shell 11 is free from the rib structure 10. With respect to the direction of the longitudinal center axis 20, the expansion region 14 is free from any rib in the interconnected angular range Δ. The interconnected angular range Δ opens toward the back end 31 of the housing 40. In a view in the separation direction 50 of the inner side of the first housing shell 11, the back end 31 of the housing 40 lies in the interconnected angular range Δ. With respect to the centroid 48, the interconnected angular range Δ covers at least one angular range of ±10° around the back end 31 of the housing 40.

The rib structure 10 has a plurality of ribs. The plurality of ribs includes the ribs 41 and 42. Directly adjacent ribs 41, 42 of the plurality of ribs are each at a neighboring angular distance from one another with respect to the centroid 48 of the handle opening 33. Directly adjacent ribs 41, 42 can be connected to one another by transverse ribs. Nevertheless, the directly adjacent ribs 41, 42 are at the neighboring angular distance from one another. The adjacent angular distance is measured in the circumferential direction with respect to the centroid 48. The greatest neighboring angular distance $\alpha_{max}$ of the plurality of ribs is less than 50°, in the embodiment less than 20°. The interconnected angular range Δ is greater than the greatest neighboring angular distance $\alpha_{max}$. The interconnected angular range Δ is in particular twice as large, in the embodiments at least three times as large, as the greatest neighboring angular distance $\alpha_{max}$.

Along the longitudinal center axis 20, the tubular section 9 has cross-sectional areas 24 running perpendicularly to the longitudinal center axis 20. The outer wall 3 has a part 3b, in a view in the separation direction 50 of the inner side of the first housing shell 11. The part 3b of the outer wall 3 bounds the handle opening 33, in particular in a view in the separation direction 50 of the inner side of the first housing shell 11. The outer wall 3 has a part 3c, in a view in the separation direction 50 of the first housing shell 11. The part 3c of the outer wall 3 faces away from the handle opening 33, in a view in the separation direction 50 of the inner side of the first housing shell 11. In particular, the part 3c of the outer wall 3 forms the back end 31 of the housing 40. The cross-sectional areas 24 running perpendicularly to the longitudinal center axis 20, in a view in the separation direction 50, each have a diameter, as measured from the outer side of the part 3b of the outer wall 3 to the outer side of the part 3c of the outer wall 3.

The diameter runs perpendicularly to the separation direction 50. The diameter of the associated cross-sectional area 24 running through the back end 31 of the housing 40 is referred to as the end diameter d.

The parts 3a, 3b and 3c of the outer wall 3 are formed in one piece with one another. The parts 3a, 3b and 3c of the outer wall 3 are produced jointly in a single injection molding process step.

That part of the end diameter d which lies in the rib region 13 is referred to as a rib sub-section 26. The rib sub-section 26 has a length r, as measured along the end diameter d. The length r of the rib sub-section 26 is less than 80% of the end diameter.

That part of the end diameter d which lies in the expansion region 14 is referred to as an expansion sub-section 27. The expansion sub-section 27 has a length s, as measured along the end diameter d. The length s of the expansion sub-section 27 is more than 20% of the end diameter d. A maximum diameter $d_{max}$ of all the cross-sectional areas 24 is at least 120%, in particular at least 130%, in the embodiments at least 140%, of a minimum diameter $d_{min}$ of all the cross-sectional areas 24. The cross-sectional area 24 with the maximum diameter $d_{max}$ intersects the expansion region 14, in particular in a view in the separation direction 50.

The part 3c of the outer wall 3 has a maximum wall thickness $w_{max}$ shown in FIG. 7. The maximum wall thickness $w_{max}$ is at least 120%, in the embodiments at least 130%, of the smallest wall thickness $w_{min}$ of the outer wall 3 of the housing 40. The part 3c of the outer wall 3 has the maximum wall thickness $w_{max}$, in a view in the separation direction 50 in the interconnected angular range Δ.

The expansion region 14 has a maximum expansion height hd, as measured perpendicularly to the horizontal plane E in the set-down position. The maximum expansion height hd is shown in FIG. 7. The handle opening 33 has a maximum opening height ho, as measured in the set-down position perpendicular to the horizontal plane E. The maximum opening height ho of the handle opening 33 is shown in FIG. 5. The maximum expansion height hd is at least 50%, in particular at least 60%, in the embodiment at least 70%, of the maximum opening height ho.

The plurality of ribs of the rib region 13 have a maximum rib distance hr, as measured in the set-down position in a direction perpendicular to the horizontal plane E. The maximum rib distance hr is shown in FIG. 7. The maximum rib distance hr is less than 40%, in particular less than 30%, in the embodiment less than 20%, of the maximum opening height ho of the handle opening 33.

The length s of the expansion sub-section 27 of the end diameter d is at least 5%, in the embodiment at least 10%, of the maximum opening height ho of the handle opening 33.

The expansion region 14 has a width b, as measured in the direction of the longitudinal axis 49. The width b is shown in FIG. 7. The width b of the expansion region 14 is at least 10%, in the embodiments at least 20%, of the maximum opening height ho of the handle opening 33.

Preferably, the expansion region 14, in a view in the separation direction 50 of the inner side of the first housing shell 11, has a curved shape, as shown in FIG. 7. The curvature of the expansion region 14 substantially follows the curvature of the longitudinal center axis 20 of the tubular section 9.

In a view in the separation direction 50 of the inner side of the first housing shell 11, the rib region 13 is arranged directly adjacent to the outer wall 3 forming the back end 31 of the housing 40. As shown in FIG. 7, in a view in the separation direction 50 of the inner side of the first housing shell 11, the rib region 13 is arranged directly adjacent to the part 3c of the outer wall 3 of the housing 40. In a view in the separation direction 50 of the inner side of the first housing shell 11, the expansion region 14 is arranged directly adjacent to the outer wall 3 bounding the handle opening 33. In a view in the separation direction 50 of the inner side of the first housing shell 11, the expansion region 14 is arranged directly adjacent to the part 3b of the outer wall 3.

The first housing shell 11 includes a curving section 34, in a view in the separation direction 50 of the inner side of the first housing shell 11. The curving section 34 has an interconnected rigid rib section 36. Ribs 41, 42 of the rib structure 10 are arranged in the rib section 36. The curving section 34 has an interconnected elastic expansion section 37. The elastic expansion section 37 is used for the elastic absorption of energy released in the event of an impact of the work apparatus 1.

The expansion section 37 is adjacent directly to the rib section 36. The expansion section 37 is at a greater distance a from the back end 31 of the housing 40 than the rib section 36.

In a view in the separation direction 50 of the inner side of the first housing shell 11, the rib section 36 has a rib outer contour 38, shown schematically by dashed lines in FIG. 7. The rib outer contour 38 bounds a rib surface. Ribs 41, 42 of the rib structure 10 are arranged within the rib outer contour 38. On the side of the rib outer contour 38 facing away from the back end 31, the rib outer contour 38 is bounded by a perpendicular to the longitudinal axis 49 through the start point A of the handle opening 33. In the embodiments, the remaining part of the rib outer contour 38 is formed by a part of the outer contour of the housing 40, in a view in the separation direction 50 of the inner side of the first housing shell 11.

In a view in the separation direction 50 of the inner side of the first housing shell 11, the expansion section 37 has an expansion outer contour 43, shown schematically by dashed lines in FIG. 7. The expansion outer contour 43 bounds an expansion section surface. On the side of the expansion outer contour 43 facing away from the back end 31, the expansion outer contour 43 is bounded by a perpendicular to the longitudinal axis 49 through the start point A of the handle opening 33. In the embodiments, the remaining part of the expansion outer contour 43 is formed by that part of the outer contour of the expansion region 14 which faces the back end 31 of the housing 40.

In a view in the separation direction 50 of the inner side of the first housing shell 11, the area covered by ribs 41, 42 within the rib outer contour 38 is at least 30%, in particular at least 35% of the rib surface.

In a view in the separation direction 50 of the inner side of the first housing shell 11, the area covered by ribs 41, 42 within the expansion outer contour 43 is less than 10%, in particular less than 5%, in the embodiments 0% of the expansion section surface.

The curving section 34 has a total outer contour 44 with a curving surface, in a view in the separation direction 50 of the inner side of the first housing shell 11. The expansion section surface is at least 20% of the curving surface.

The rib surface is at most 85%, in particular at most 80%, in the embodiments at most 75% of the curving surface.

The rib section 36 is arranged directly adjacent to the outer wall 3 forming the back end 31 of the housing 40, in a view in the separation direction 50 of the inner side of the first housing shell 11. The expansion section 37 is arranged directly adjacent to the outer wall 3 bounding the handle opening 33, in a view in the separation direction 50 of the inner side of the first housing shell 11.

The expansion section 37 extends with respect to the direction of the longitudinal axis 49 over at least 10%, in the embodiments over at least 20% of the longitudinal extent of the curving section 34 in the direction of the longitudinal axis 49 of the housing 40.

The rib section 36 extends with respect to the direction of the longitudinal axis 49 over at most 90%, in the embodiments over at most 75% of the longitudinal extent of the curving section 34 in the direction of the longitudinal axis 49 of the housing 40.

The expansion section 37 has a maximum expansion section height hda, as measured perpendicularly to the horizontal plane E in the set-down position. The maximum expansion section height hda is shown in FIG. 7. The maximum expansion section height hda is at least 50%, in particular at least 60%, in the embodiment at least 70% of the maximum opening height ho shown in FIG. 5.

The first housing shell 11 has a connecting element 28. The connecting element 28 is also referred to as a connecting structure. The connecting element 28 is used to connect the first housing shell 11 to the second housing shell 12. In the embodiment, the connecting element 28 is a screw dome. However, it may also be provided that the first housing shell 11 is connectable to the second housing shell 12 via a latching or clip connection. It can also be provided that the first housing shell 11 is connectable to the second housing shell 12 via a rivet. A plurality of ribs, in FIG. 7, for example, the rib 42 of the rib structure 10, are connected to the connecting element 28 in such a way, and are arranged in the first housing shell 11 in such a way, that they can introduce force into the connecting element 28. The rib 42 runs from the part 3c of the outer wall 3 toward the connecting element 28, as shown in FIG. 7. Thus, the rib 42 can conduct energy from the outer part 3c of the outer wall 3 toward the connecting element 28, which is in the form of a screw dome, upon the impact of the work apparatus 1. The connecting element 28 is arranged in the rib region 13, in a view in the separation direction of the inner side of the first housing shell 11.

The first housing shell 11 is connected via the connecting element 28 to the second housing shell 12 in such a way that the connecting element 28 can transmit the energy released in an impact of the work apparatus 1 from the first housing shell 11 via the connecting element 28 to the second housing shell 12.

Figure 6:
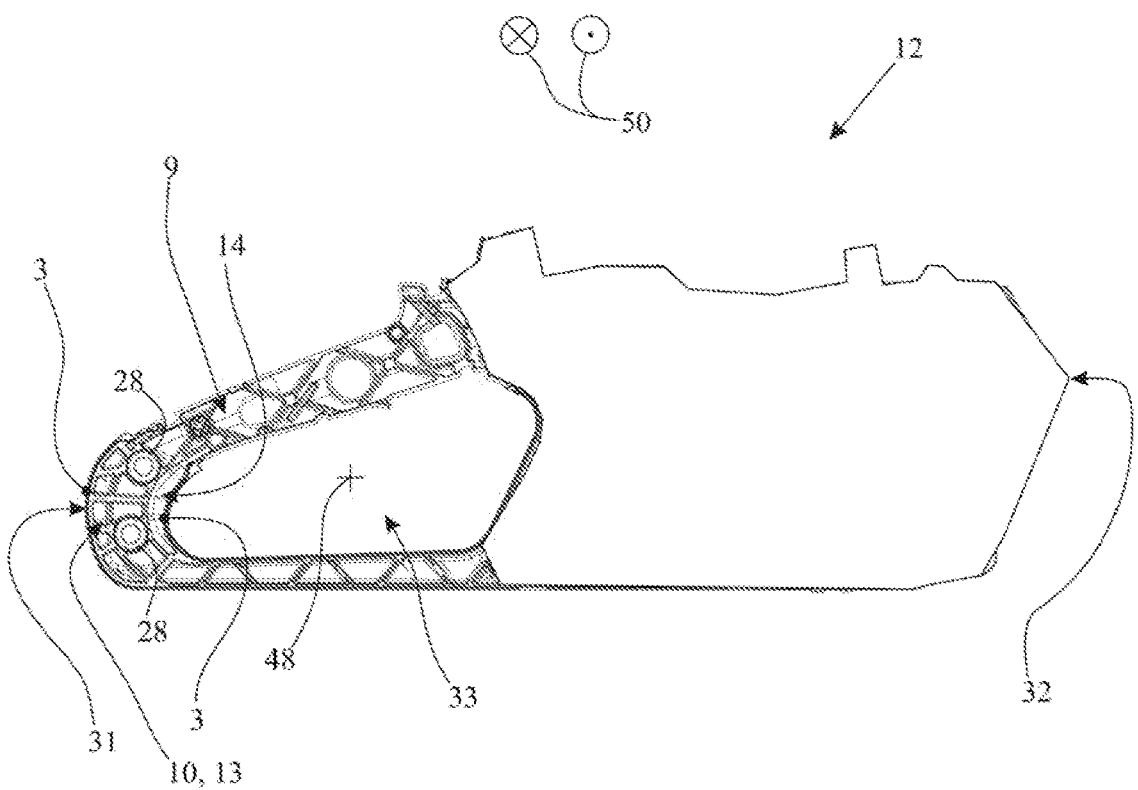
FIG. 6 shows a schematic view in the separation direction of the two housing shells shown in FIG. 4 on the inner side of the second housing shell.
Figure 8:
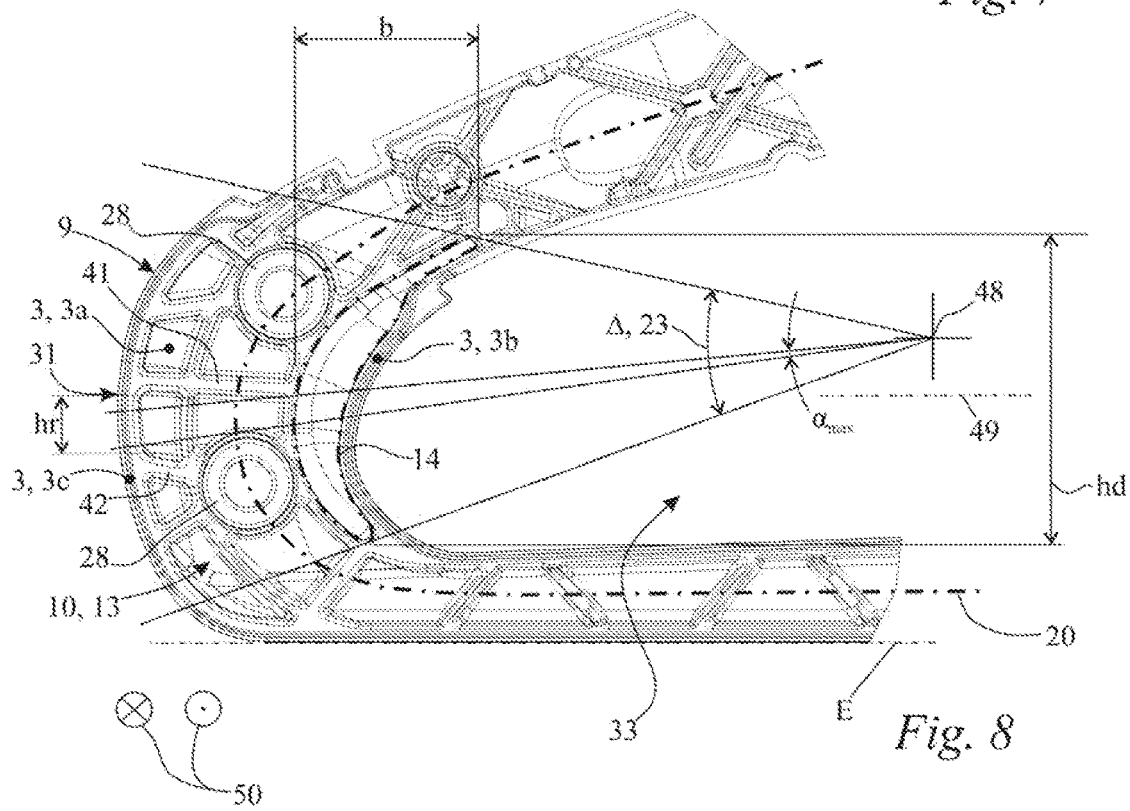
FIG. 8 shows an enlarged detailed illustration of the tubular section of the second housing shell shown in FIG. 6.

As shown in FIGS. 6 and 8, the second housing shell 12 is formed in the same way as the first housing shell 11. Accordingly, the same reference signs as for FIGS. 5 and 7 are used for FIGS. 6 and 8. The description of FIGS. 5 and 7 and also the rest of the description also applies to FIGS. 6 and 8. In particular, the second housing shell 12 also has an expansion region 14 and a rib region 13. The two expansion regions 14 of the first and the second housing shell 11 and 12 correspond to each other and together form a single large expansion region in the assembled state of the housing 40. The connecting elements 28 of the first and the second housing shells 11 and 12 also correspond to each other. In particular, the second housing shell 12 also has an expansion section 37 and a rib section 36. The two expansion sections 37 of the first and the second housing shell 11 and 12 correspond to each other and together form a single large expansion section in the assembled state of the housing 40.

For reasons of clarity, not all of the reference signs and dimensions used in FIG. 7 are shown in FIG. 8. Nevertheless, the second housing shell 12 also has the corresponding dimensions and features. The description of the first housing shell 11 applies analogously completely to the second housing shell 12.

The second housing shell 12 also has a rib region 13 and/or a rib section 36 and an expansion region 14 and/or an expansion section 37.

The second housing shell 12 also has a connecting element 28. The connecting element 28 of the second housing shell 12 may also be referred to as a connecting structure. Expediently, the connecting element 28 of the second housing shell 12 is arranged in the rib region 13 and/or in the rib section 36 of the second housing shell 12.

Figure 10:
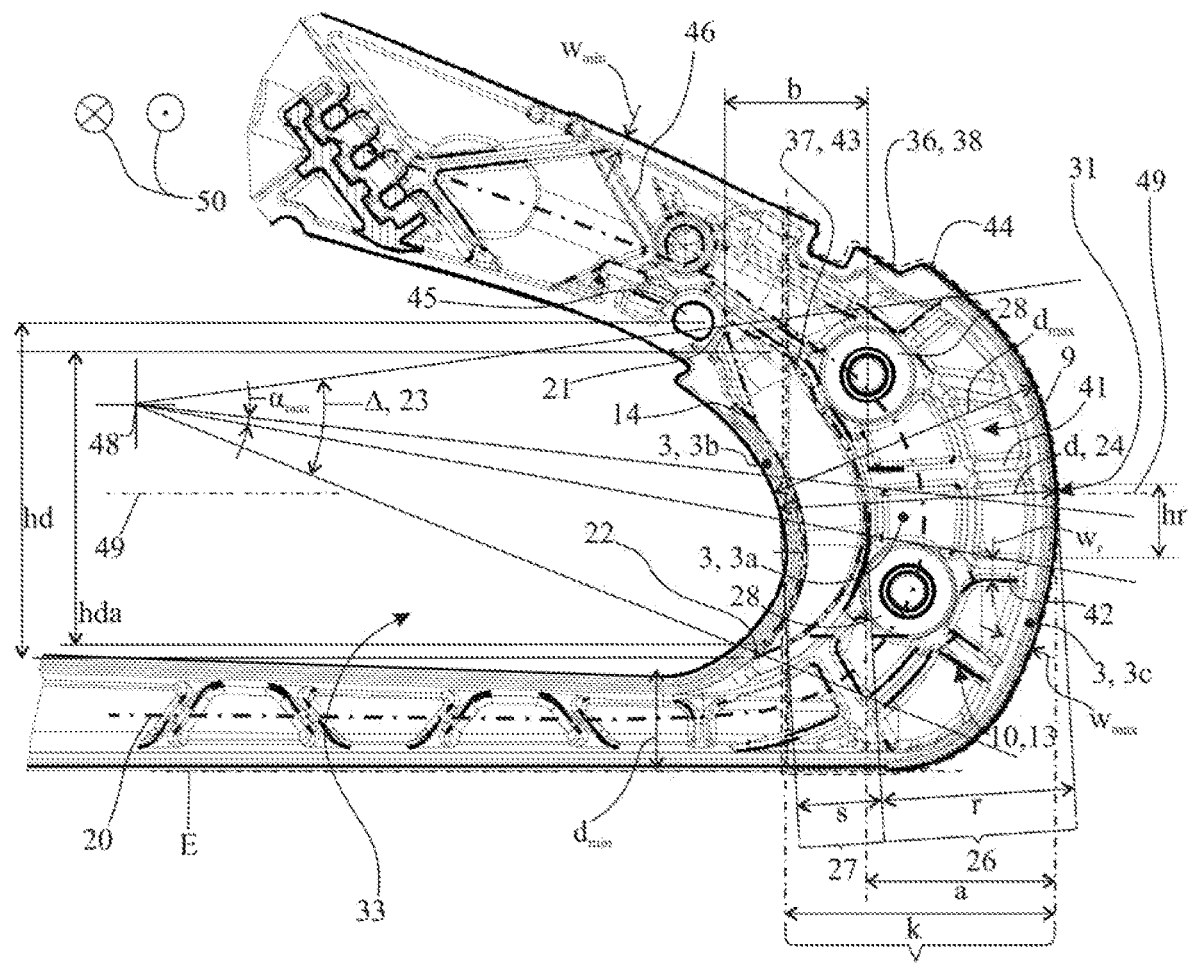
FIG. 10 shows a detailed illustration of an alternative tubular section.

FIG. 10 shows an alternative configuration of the tubular section 9 of the work apparatus 1. The illustration is analogous to FIG. 7 and differs only in two details from FIG. 7. The previous description also applies fully to FIG. 10. In addition, FIG. 10 shows an additional rib 46. The additional rib 46 is arranged above the expansion region 14. The additional rib 46 extends in the tubular section 9 substantially in the direction of an extension of the profile of the expansion region 14. The additional rib 46 is arranged at a distance from the expansion region 14. The additional rib 46 is arranged in the interconnected rigid rib region 13. The additional rib 46 is part of the rib structure 10.

In addition, FIG. 10 shows a dome 45. The dome 45 is in the shape of a hollow cylinder at least in sections. The dome 45 extends in the separation direction 50. The dome 45 has a central cylinder longitudinal axis, which extends in the separation direction 50. The dome 45 is arranged between the additional rib 46 and the expansion region 14.

Figure 9:
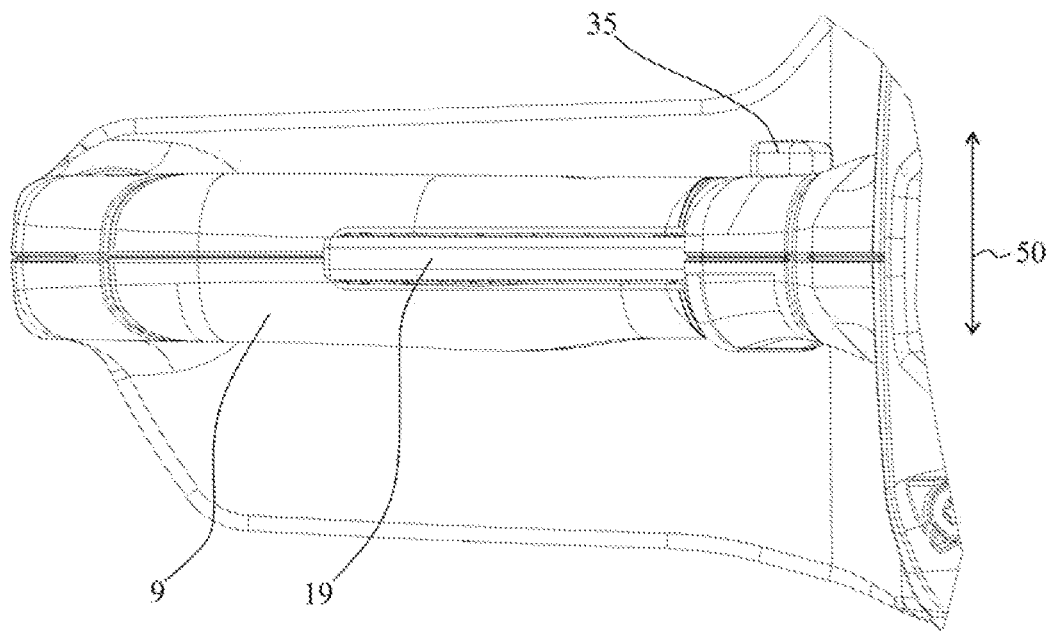
FIG. 9 shows a detail from FIG. 4.

As shown in FIGS. 1 and 9, the work apparatus 1 has a further operator-controlled element 19. The work apparatus 1 has a blocking element 35 shown by way of example for all of the embodiments in FIG. 9. The blocking element 35 is used for blocking the operator-controlled element 15 for operating the electric motor 4. The work apparatus 1 is advantageously configured such that the operator-controlled element 15 can only be actuated when the blocking element 35 is in an unlock position. The operator can push the blocking element 35 into the unlock position. A spring force must be overcome here. To ensure that the operator does not have to keep the blocking element 35 permanently pressed into the unlock position, the further operator-controlled element 19 is provided. The further operator-controlled element 19 is a holding element in the embodiments. The blocking element 35 can be comfortably held in the unlock position with the holding element. When the holding element is actuated, pressing of the blocking element 35 into the unlock position is no longer permanent, but only required initially. After initial pressing of the blocking element 35 into the unlock position, the blocking element 35 can be held in the unlock position, preferably mechanically, via (permanent) actuation of the holding element. The holding element is configured as a lever.

The blocking element 35 protrudes in the separation direction 50 over the housing wall 3 (FIG. 9). Preferably, in the set-down position, the further operator-controlled element 19 protrudes from the operator region 2 of the housing 40 in a direction away from the horizontal plane E (FIG. 1). The further operator-controlled element 19 is arranged in the operator region 2 of the housing 40 (FIG. 1).

Instead of mechanical operator-controlled elements, an electronic operating system may also be provided.

It is understood that the foregoing description is that of the preferred embodiments of the invention and that various changes and modifications may be made thereto without departing from the spirit and scope of the invention as defined in the appended claims.

The invention claimed is:

1. A handheld work apparatus comprising:
a housing having a front end;
a work tool arranged on said front end of said housing;
said housing having a back end to which an operator region of said housing is assigned;
said housing having a first housing shell and a second housing shell configured to be separable in a separation direction and assembled when assembling the housing;
said housing having an outer wall;
said first housing shell including a first segment of said outer wall;

said operator region defining a handle opening which completely penetrates said housing in the separation direction;

said operator region being bounded by a tubular section of said outer wall in a region of said back end of said housing;

said first segment of said outer wall being reinforced in a region of the tubular section by a rib structure inside the housing;

wherein, in a view in the separation direction of an inner side of said first housing shell, in the region of said tubular section, the first housing shell has:

an interconnected rigid rib region in which said rib structure is arranged, and, an interconnected elastic expansion region for an elastic absorption of energy released in an event of an impact of the work apparatus; and, wherein said interconnected elastic expansion region is directly adjacent to said interconnected rigid rib region and is at a greater distance from said back end of said housing than said rib region.

2. The work apparatus of claim 1, wherein said expansion region is at least one of free from said rib structure and completely free from said rib structure.

3. The work apparatus of claim 1, wherein said tubular section extends along a longitudinal center axis; and, in the view in the separation direction of said inner side of said first housing shell, the longitudinal center axis divides said tubular section into an expansion half associated with said handle opening and a rib half associated with said back end.

4. The work apparatus of claim 3, wherein said interconnected elastic expansion region is completely arranged in said expansion half.

5. The work apparatus of claim 3, wherein said interconnected rib region is arranged both in said rib half and in said expansion half.

6. The work apparatus of claim 3, wherein said interconnected elastic expansion region extends in a direction of the longitudinal center axis from a start point to an end point in an extension region; in a view in the separation direction of said housing, said handle opening has a centroid; and, in the view in the separation direction of said housing, said extension region of said interconnected elastic expansion region extends in an interconnected angular range of at least 30° with respect to said centroid.

7. The work apparatus of claim 6, wherein said rib structure has a plurality of ribs, wherein directly adjacent ribs are each at a neighboring angular distance from one another with respect to said centroid of said handle opening; and, a largest neighboring angular distance of said plurality of ribs is less than 25°.

8. The work apparatus of claim 1, wherein the work apparatus is configured such that it can be set down in a set-down position provided for it on a horizontal plane; said interconnected elastic expansion region has a maximum expansion height, as measured perpendicularly to the horizontal plane in the set-down position; said handle opening has a maximum opening height, as measured perpendicularly to the horizontal plane in the set-down position; and, said maximum expansion height is at least 50% of said maximum opening height.

9. The work apparatus of claim 1, wherein, in a view in the separation direction of said inner side of said first housing shell, said interconnected rib region is arranged directly adjacent to said outer wall forming said back end of said housing; and, in the view in the separation direction of said inner side of said first housing shell, said interconnected elastic expansion region is arranged directly adjacent to said outer wall bounding said handle opening.

10. The work apparatus of claim 1, wherein said first housing shell has a connecting element or a connecting structure for connecting said first housing shell to said second housing shell; and, a plurality of ribs of said rib structure are connected to said connecting element in such a way and are arranged in said first housing shell in such a way, that said plurality of ribs are configured to introduce force into said connecting element.

11. The work apparatus of claim 10, wherein said connecting element or said connecting structure is arranged in said rib region.

12. The work apparatus of claim 1, wherein said first housing shell and said second housing shell are completely composed of glass-fiber-reinforced plastic.

13. The work apparatus of claim 1, wherein said first housing shell and said second housing shell are completely composed of polyamide 6 with a glass fiber content of 15%.

14. The work apparatus of claim 13, wherein the polyamide 6 is impact-modified.

15. The work apparatus of claim 1, wherein said second housing shell with respect to said rib structure and said expansion region or said interconnected elastic expansion section is formed analogously to said first housing shell.

16. The work apparatus of claim 1, wherein said second housing shell also has at least one of a rib region, a rib section, an expansion region, and an expansion section.

17. The work apparatus of claim 16, wherein said second housing shell also has a connecting element or a connecting structure; and, said connecting element or said connecting structure of said second housing shell is arranged in said rib region of said second housing shell.

18. A handheld work apparatus comprising:

a housing having a front end;

a work tool arranged on said front end of said housing;

said housing having a back end to which an operator region of said housing is assigned;

said housing extending along a longitudinal axis from said back end to said front end;

said housing having a first housing shell and a second housing shell configured to be separable in a separation direction and assembled when assembling said housing;

said housing having an outer wall;

said first housing shell including a first segment of said outer wall;

said operator region defining a handle opening which completely penetrates said housing in the separation direction;

said handle opening having a start point, wherein, in a view in the separation direction of an inner side of said first housing shell, said start point is at the smallest distance, as measured in a direction of the longitudinal axis, from said back end of said housing;

said housing having a curving section extending in the direction of the longitudinal axis from said back end to said start point;

said first segment of said outer wall being reinforced in said region of said curving section by a rib structure inside said housing;

wherein, in the view in the separation direction of said inner side of said first housing shell, said first housing shell, in said curving section, has:

an interconnected rigid rib section in which a plurality of ribs of said rib structure are arranged, and an interconnected elastic expansion section for an elastic absorption of energy released in an event of an impact of the work apparatus;

said interconnected elastic expansion section being directly adjacent to said rib section and being at a greater distance from said back end of said housing than said rib section, wherein, in the view in the separation direction of said inner side of said first housing shell:

said rib section has a rib outer contour with a rib surface, said interconnected elastic expansion section has an expansion outer contour with an expansion section surface, an area covered by said plurality of ribs within said rib outer contour is at least 30%, and an area covered by ribs within said expansion outer contour is less than 10% of said expansion section surface.

19. The work apparatus of claim 18, wherein, in the view in the separation direction of said inner side of said first housing shell, said curving section has a total outer contour with a curving surface; and, said interconnected elastic expansion section surface is at least 20% of said curving surface.

20. The work apparatus of claim 19, wherein, in the view in the separation direction of said inner side of said first housing shell, said rib section is arranged directly adjacent to said outer wall forming said back end of said housing; and, in the view in the separation direction of said inner side of said first housing shell, said interconnected elastic expansion section is arranged directly adjacent to said outer wall bounding said handle opening.

\* \* \* \* \*